(12) United States Patent
Ramfjord

(10) Patent No.: US 11,339,549 B2
(45) Date of Patent: May 24, 2022

(54) INCLINED CUT GBS LEG

(71) Applicant: 1Diamond AS, Gjøvik (NO)

(72) Inventor: Harald Ramfjord, Gjøvik (NO)

(73) Assignee: Quanta Associates, L.P., Houston, TX (US)

( * ) Notice: Subject to any disclaimer, the term of this patent is extended or adjusted under 35 U.S.C. 154(b) by 0 days.

(21) Appl. No.: 16/966,209

(22) PCT Filed: Jan. 30, 2019

(86) PCT No.: PCT/NO2019/050025
§ 371 (c)(1),
(2) Date: Jul. 30, 2020

(87) PCT Pub. No.: WO2019/151873
PCT Pub. Date: Aug. 8, 2019

(65) Prior Publication Data
US 2021/0047795 A1 Feb. 18, 2021

(30) Foreign Application Priority Data

Jan. 30, 2018 (NO) .................................. 20180143

(51) Int. Cl.
*E02B 17/00* (2006.01)
*B23D 57/00* (2006.01)
*B28D 1/08* (2006.01)

(52) U.S. Cl.
CPC .......... *E02B 17/00* (2013.01); *B23D 57/0007* (2013.01); *B23D 57/0061* (2013.01);
(Continued)

(58) Field of Classification Search
CPC B23D 57/0007; B23D 57/0061; B28D 1/088; E02B 17/00; E02B 2017/0052; E02B 2017/0069
See application file for complete search history.

(56) References Cited

U.S. PATENT DOCUMENTS 3,056,267 A * 10/1962 McRee ..................... E02D 9/04
405/191
3,463,271 A  8/1969 St. Louis
(Continued)

FOREIGN PATENT DOCUMENTS

CN 201128080 Y 10/2008
CN 101612683 A 12/2009
(Continued)

OTHER PUBLICATIONS

EPO, Rijks, Mark, Written Opinion of the International Searching Authority, pp. 1-5, dated Jun. 30, 2015, The Hague, Netherlands.
(Continued)

*Primary Examiner* — Tara Mayo-Pinnock
(74) *Attorney, Agent, or Firm* — Oathout Law Firm; Mark A. Oathout

(57) ABSTRACT

The present invention relates to a gravity based structure 5 with a topside 2 on at least one hollow concrete platform leg 1 with a platform leg wall and a circular cross section. The at least one platform leg, includes an upper leg portion (4) cut off from a lower leg portion 3. The lower leg portion 3 has an upper sloped cut surface 10 inclined at an angle in the range of 1°-10° off a horizontal axis. The upper leg portion 4 has an upper leg sloped cut surface inclined at the same angle as the lower leg sloped cut surface 10 of the lower leg portion 3 whereby the angles are complementary, the sloped cut surfaces forming an inner and an outer obtuse cone with a common vertical longitudinal axis. Furthermore, the invention relates to method of forming a conical cut through a concrete platform leg of a GBS.

7 Claims, 4 Drawing Sheets

(52) U.S. Cl.
CPC ...... *B28D 1/088* (2013.01); *E02B 2017/0052* (2013.01); *E02B 2017/0069* (2013.01)

(56) References Cited

U.S. PATENT DOCUMENTS

| | | | |
|---|---|---|---|
| 3,635,207 A | | 1/1972 | Grage |
| 3,667,515 A | * | 6/1972 | Corey ................... E02D 9/04 83/743 |
| 4,144,867 A | | 3/1979 | Wachs |
| 4,494,523 A | | 1/1985 | Wells |
| H45 H | | 4/1986 | Gilmore |
| 4,633,848 A | | 1/1987 | Bresciani |
| 4,678,372 A | | 7/1987 | Cousty |
| 4,765,307 A | | 8/1988 | Kubo |
| 5,060,628 A | | 10/1991 | Ishida |
| 5,361,748 A | * | 11/1994 | Matteucci ............ B23D 53/003 125/21 |
| 5,645,040 A | | 7/1997 | Bieri Jun |
| 5,718,216 A | | 2/1998 | Plattner |
| 5,875,771 A | | 3/1999 | Plattner |
| 6,267,037 B1 | | 7/2001 | McCoy, Jr. |
| 6,273,645 B1 | | 8/2001 | Hamre |
| 6,371,696 B1 | | 4/2002 | Eathorne |
| 7,036,599 B2 | | 5/2006 | Matteucci |
| 7,121,310 B2 | * | 10/2006 | Clark et al. ......... B23D 57/0084 144/24.12 |
| 7,770,575 B2 | | 8/2010 | Brocco |
| 7,922,424 B2 | * | 4/2011 | Clark, II ............ B23D 57/0038 405/156 |
| 8,286,625 B2 | | 10/2012 | Jenkins |
| 8,833,219 B2 | | 9/2014 | Pierce |
| 8,833,358 B1 | | 9/2014 | Robinson, III |
| 9,457,490 B2 | | 10/2016 | Oberg |
| 2001/0017072 A1 | | 8/2001 | Poetzsch |
| 2001/0029939 A1 | | 10/2001 | Mazaki et al. |
| 2002/0112582 A1 | | 8/2002 | Young |
| 2004/0069103 A1 | | 4/2004 | Matteucci |
| 2006/0115331 A1 | | 6/2006 | Matteucci |
| 2006/0201302 A1 | | 9/2006 | Schwaiger et al. |
| 2008/0304915 A1 | | 12/2008 | Bang |
| 2009/0266552 A1 | | 10/2009 | Barra et al. |
| 2010/0186564 A1 | | 7/2010 | Pierce |
| 2010/0212164 A1 | | 8/2010 | Garavaglia et al. |
| 2011/0150623 A1 | | 6/2011 | Thomas et al. |
| 2011/0192389 A1 | | 8/2011 | Jang |
| 2011/0208358 A1 | | 8/2011 | Gjelsten et al. |
| 2011/0214543 A1 | | 9/2011 | Shae et al. |
| 2011/0290501 A1 | | 12/2011 | Duncan et al. |
| 2012/0117959 A1 | | 5/2012 | Lewkoski |
| 2012/0152071 A1 | * | 6/2012 | Matteucci .......... B23D 57/0084 83/52 |
| 2012/0174723 A1 | | 7/2012 | Matteucci |
| 2012/0189390 A1 | | 7/2012 | Belinsky et al. |
| 2014/0109740 A1 | | 4/2014 | Shae et al. |
| 2014/0157964 A1 | | 6/2014 | Davis et al. |
| 2015/0027287 A1 | | 1/2015 | Harper et al. |
| 2015/0290727 A1 | | 10/2015 | Matteucci |
| 2015/0321290 A1 | | 11/2015 | Zediker et al. |
| 2016/0035443 A1 | | 2/2016 | Park et al. |
| 2017/0320150 A1 | * | 11/2017 | Ramfjord ........... B23D 57/0007 |
| 2019/0106854 A1 | * | 4/2019 | Lang ................... B63B 1/121 |

FOREIGN PATENT DOCUMENTS

| | | |
|---|---|---|
| CN | 102229009 A | 11/2011 |
| DE | 259092 A1 | 8/1988 |
| DE | 3718281 A1 | 8/1991 |
| EP | 0050852 A1 | 5/1982 |
| EP | 1055498 | 11/2000 |
| EP | 0540834 B2 | 5/2004 |
| FR | 2734192 A1 | 11/1996 |
| GB | 2458053 B | 1/2011 |
| GB | 2516296 A | 5/2017 |
| JP | H05141106 A | 6/1993 |
| JP | H10258423 A | 9/1998 |
| JP | 2001162617 A | 6/2001 |
| NO | 20070788 | 7/2008 |
| WO | 86/06121 A1 | 10/1986 |
| WO | 88/02718 A1 | 4/1988 |
| WO | 99/10232 A1 | 3/1999 |
| WO | 99/43921 A1 | 9/1999 |
| WO | 00/78491 A1 | 12/2000 |
| WO | 2009084953 | 7/2009 |
| WO | 2009107153 A1 | 9/2009 |
| WO | 2011062504 | 5/2011 |
| WO | 2013080228 A1 | 6/2013 |
| WO | 2014092568 | 6/2014 |
| WO | 2014106081 A1 | 7/2014 |
| WO | 2017007946 A1 | 1/2017 |

OTHER PUBLICATIONS

UK IPO, Parker, Megan, Examination Report under Section 18(3), pp. 1-3, dated Oct. 3, 2016, Newport, South Wales.
O'Connell, Wayne, Examination report No. 1 for standard patent application, dated Mar. 27, 2017, 4 pages, IP Australia, Australia.
Rode, Henrik M., Norwegian Search Report for Patent Application No. 20141423, dated Apr. 21, 2015, 2 pages, Norwegian Industrial Property Office, Norway.
Jose Enrique Cazares Avila, Ref: Su solicitud No. MX/a/2015/008411 de Patente PCT presentada el 27 de diciembre de 2013, May 25, 2018, 5 pages, IMPI, Mexico.
Prakash Rudani, Examination Report under sections 12 & 13 of the Patents Act, 1970 and the Patents Rules, 2003, dated Mar. 12, 2019, 6 pages, Intellectual Property India, Mumbai, India.
Christensen, Eirik, Written Opinion of the International Searching Authority for PCT/NO2015/050225, dated Mar. 4, 2016, 4 pages, Nordic Patent Institute, Denmark.
MacFarlane, Evan H, Office Action for U.S. Appl. No. 14/655,848, dated Jun. 26, 2017, 20 pages, United States Patent and Trademark Office, Alexandria, VA, United States.
MacFarlane, Evan H, Office Action for U.S. Appl. No. 14/655,848, dated Nov. 17, 2017, 28 pages, United States Patent and Trademark Office, Alexandria, VA, United States.
International Patent Application No. PCT/IB2017/054854, International Search Report and Written Opinion dated Oct. 30, 2017 (10 Pages).
International Patent Application No. PCT/IB2017/054854, International Preliminary Report on Patentability dated Nov. 15, 2018 (16 pages).
Norwegian Patent Application No. 20161298 Norwegian Search Report dated Feb. 22, 2017 (2 pages).
Norwegian Patent Application No. 20180147 Norwegian Search Report dated Aug. 29, 2018 (2 pages).
Petter Nøklebye, NIPO Office Action for Norwegian Patent Application No. 20180147, dated Aug. 29, 2018, 3 pages, Norwegian Industrial Property Office, Norway.
Norwegian Patent Application No. 20180143 Norwegian Search Report dated Aug. 29, 2018 (2 pages).
Petter Nøklebye, NIPO Office Action for Norwegian Patent Application No. 20180143, dated Aug. 29, 2018, 4 pages, Norwegian Industrial Property Office, Norway.

* cited by examiner

INCLINED CUT GBS LEG

The present invention concerns cut legs on gravity based structures of reinforced concrete.

Furthermore, the invention concerns a method for cutting such structures for decommissioning purposes. Other fields of use include nuclear power stations and factory chimneys.

When offshore oilfields are depleted or offshore platforms of some reason are taken out of service, the companies running the installations are obliged to remove or maintain at least parts of the installation. Such decommissioning and removal poses several challenges. One challenge is removal of the topside on GBS offshore installations. Many installations include a topside with a Main Support Frame or MSF fixed to the gravity based structures (GBS) legs. In many cases, these legs must be cut before the MSF can be lifted. Legs of this kind are often made of steel reinforced concrete.

Cutting of GBS legs is proposed in GB2458053 (B), (same applicant). This publication proposes providing a wire saw with a first frame surrounding the leg and moving a second frame with a sawing wire loop in relation to the first frame and cut the leg. The saw spans the entire diameter of the leg. The cut is horizontal and a cut surface is plane. The leg, formed with a wall structure, does not form a part of the saw.

With the above solution, the cut transition between the upper part and the lower part remains plane, and there is a risk that the upper part/topside move in a horizontal plane under the influence of wind, large waves, due to motion in the structure etc. Furthermore, the magnitude of the span of the saw, may reduce the accuracy of the cut, and an inaccurate cut can make the situation difficult. An accurate cut is also important to avoid any issues with inadvertently cutting into reinforcing steel inside the concrete. Cutting into stressed steel reinforcements extending downwards from the cut that may jeopardize the integrity of the leg with possible leg failure and fatal consequences.

A cutting process is time consuming, and it is important that the GBS maintains its integrity, only resting on its legs, even after the legs are cut. In some cases, the GBS must remain complete, with its legs cut off for extended periods of time, for instance while waiting for a weather window with a sufficiently calm weather to allow a topside to be lifted off the cut legs.

Accordingly there is a need for a gravity based structure with legs that for a time period after the legs are cut and before the topside is lifted off, maintains its structural integrity to satisfy safety requirements and to prevent a catastrophe.

It is a purpose with the present invention to provide a solution that will enable a GBS to resist a 100 year wave in the above explained cut off state, only resting on its cut off legs due to gravity. Furthermore, it is a purpose to reduce the risk that the topside move sideways due to fluctuating forces from wind and waves. Microscopic movements of the legs may result in side forces acting on the cut interface, allowing the topside to gradually work it way sideways on the legs to the extent that an unpredictable situation may be the result.

The present invention solves this issue by providing a platform with legs that are cut off, still in a horizontal plane, but at an angle to allow the transition between to two cut part to form an obtuse cone. The upper and lower parts are formed simultaneously, and the cutting process will induce negligible motion in the cutting area.

Furthermore, the present invention provides a wire saw where the wall structure of the leg forms a part of a sawing system.

Cutting of such legs involve a certain risk, and it is an advantage if the cutting can be controlled from a remote location to reduce the risk for operating personnel.

Accordingly, the present invention relates to a gravity based structure with a topside on at least one hollow concrete platform leg with a platform leg wall and a circular cross section. The leg includes an upper leg portion cut off from a lower leg portion, the lower leg portion being secured to a foundation, wherein the upper leg portion is separate from and resting on the lower leg portion, wherein the lower leg portion has an upper sloped cut surface inclined at an angle of 1°-10° off a horizontal axis, and wherein the upper leg portion has an upper leg sloped cut surface inclined at the same angle as the lower leg sloped cut surface of the lower leg portion whereby the angles are complementary, the sloped cut surfaces form a part of an inner and an outer obtuse cone with a common vertical longitudinal axis. The cut or transition may also be considered as frustum shaped.

There is however a concern that angles in the range of 5°-10° creates wedging, sticking and unwanted hoop stresses. Accordingly the angle may be in the range of 1°-5° off a horizontal axis. A good compromise has been found to be an angle of 5° off a horizontal axis.

The gravity based structure may include three or more hollow concrete platform legs.

The lower leg portion may include reinforcement steel embedded in the concrete platform leg wall. The reinforcement steel may have an upper portion ending a distance below the upper sloped cut surface, whereby the cut between the upper leg portion and the lower leg portion, not extend through the reinforcement steel embedded in the platform leg wall of the lower leg portion.

Furthermore, the invention relates to a method of forming a conical cut through a concrete platform leg of a GBS, with a leg wall and a circular cross-section. The method comprises securing at least one guide track in a horizontal plane around the platform leg, forming at least one hole through the leg wall, attaching a machine operated saw onto the horizontal guide track with a sawing portion through the hole of the leg wall, and operating the saw while moving the saw along the horizontal guide track and sawing through the leg wall at an angle within the range 1°-5° off a horizontal axis, while sawing through a full 360° around the platform leg wall thus dividing the concrete platform leg into an upper leg portion and a lower leg portion.

Industrial rope access techniques are typically used to install rails surrounding the legs. The cut can be located very close to the overhead structure. It is of great importance that the cut is located above steel reinforcements extending down into the leg and that can cause unpredictable results if they are cut. This can be a zone with a height of approximately 15 cm, so positioning and accuracy is vital.

SHORT DESCRIPTION OF THE ENCLOSED DRAWINGS

Figure 1:
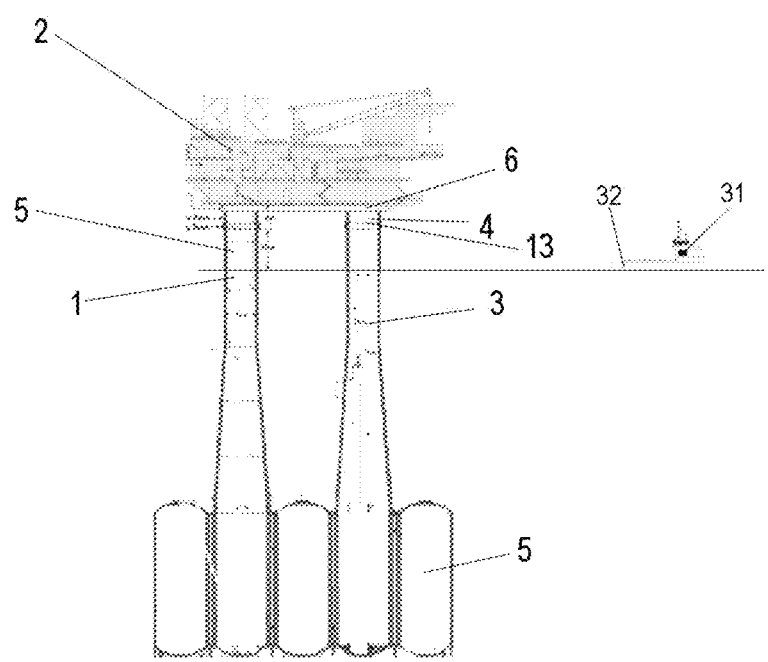
FIG. 1 shows an offshore platform for exploration of hydrocarbons.

FIG. 1 shows an offshore platform for exploration of hydrocarbons. The offshore platform is about to become decommissioned and the platform legs 1 are cut for removal of the topside 2. The offshore platform is a GBS, (Gravity Based Structure) and the legs 1 are steel reinforced concrete legs on a GBS caisson located on a seabed. The topside 2 sits on top of a girder deck structure/cellar deck 6 secured to the platform legs 1. The platform includes three platform legs 1. Each platform leg 1 includes a lower leg portion 3 extending from the GBS caisson and an upper leg portion 4 secured to the girder deck structure. The girder deck structure 6 forms a rigid foundation/base for the topside 2. A sloped cut 13 in the circular cross-section of each leg forms a transition between the lower leg portion 3 and the upper leg portion 4. The upper leg portion 4 is very short compared to the lower leg portion as the upper leg portion is located above any internal steel reinforcements extending down into the leg that would compromise the leg integrity if cut. The sloped cut 13 in the circular cross-section of the leg forms a conical/frustoconical surface. The inclination of the sloped cut is 5°. The modest inclination allows the forces from the weight of the topside to be evenly distributed over the transitional area without inducing substantial additional stresses in the legs 1 after they are cut. Steeper inclination could result in unwanted hoop stresses in the legs 1. Steep inclination could also result in a wedging and sticking of the legs, resulting in difficulties when the topside is to be lifted off the legs. The sloped cut also ensures that the topside will be centred on the legs, even under substantial horizontal loads from winds, waves etc. The cut is performed above any steel reinforcements to prevent any unpredictable conditions and possible fatal collapse of a leg. A support vessel 32 with a remote controller 32 monitors and controls a cutting process, forming the sloped cut 13.

Figure 2:
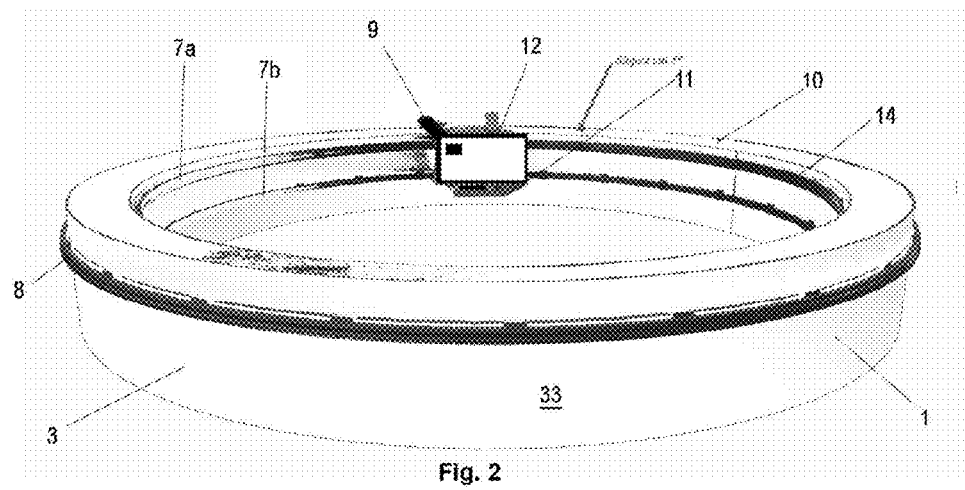
FIG. 2 is a perspective view of a part of a lower leg portion of a platform leg.

FIG. 2 is a perspective view of a part of a lower leg portion 3 of a platform leg 1. The platform leg 1 includes wall structure 33 that is cut. The lower leg sloped cut surface 10 is shown with a 5° inwards inclination. On FIG. 2, the topside and the upper leg portion is removed, while the master sawing unit 12 is in place for illustration purposes. In real life however, the saw would in most cases be removed before the topside and upper leg portion is lifted off the lower leg portion 3. The master saw unit 12 with a sawing portion 9 is movable along the upper inner saw tracks 7a and the lower inner saw tracks 7b. The master saw unit 12 is driven along the inner saw tracks 7a, 7b with a saw drive 11. The sawing portion 9 is inclined 5° in relation to a horizontal plane. The inner sawing tracks 7a, 7b are interlocking with retaining elements on the master saw unit 12 to hold the master saw unit 12 onto the tracks 7a, 7b. A geared rim 14 runs along the upper inner saw track 7a and is meshing with a gear on the saw drive 11 to provide propulsion for the master saw unit 12. The platform leg 1 is cut by providing at least one initial hole (not shown) through the wall structure 33 of the leg 1 of a sufficient size to allow the sawing portion 9 to extend through the wall. The sawing portion 9 is allowed to extend through the at least one hole. The master saw unit 12 and the saw drive 11 is then operated to move the master saw unit 12 with the sawing portion 9 along the inner saw tracks 7a, 7b to saw through the wall structure 33 to cut through the leg 1 to perform the sloped cut. The saw is driven through 360° around the leg wall structure 33 to finish the cut.

The upper leg portion (not shown in FIG. 2) remains on top of the lower leg portion and remains stable due to the sloped cut.

The sawing portion 9 typically includes a flexible and longitudinal diamond element such as a diamond wire typically used for sawing purposes. A sawing portion including a blade is more difficult to use as the vertical load from the upper leg portion is considerable, and a blade will typically be jammed between the upper leg portion and the lower leg portion.

In this disclosure is the term "circular cross-section" intended to cover slightly elliptical cross-sections in a horizontal plane. It is however relevant that the cuts are performer in a horizontal plane to prevent any forces acting sideways.

Figure 3:
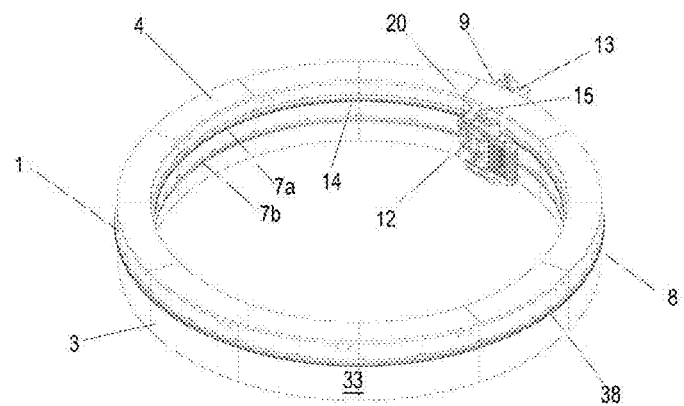
FIG. 3 is a perspective view of a portion of platform leg forming a wall structure with a saw in connection performing a cut of the invention.

FIG. 3 shows a portion of the platform leg 1 forming a wall structure 33, the upper leg portion 4 and the lower leg portion 5 with the master saw unit 12 installed, but before the leg 1 is cut. The topside 2, platform 5 etc. is removed for clarity. The outer saw track 8 runs in a horizontal circle around the outer perimeter of the platform leg along with an outer toothed rim 38. The slave unit 13 runs on the outer tracks 8 and include at least one freewheeling wheel/pulley for a diamond belt or diamond wire 15 forming the sawing portion 9 attached to the master saw unit 12. The sawing portion 9 runs at an angle in the range 1°-5° off horizontal. The slave unit 13 is powered with an electric motor to drive the slave unit 13 along the outer tracks, and the outer tracks include the toothed rim 38 meshing with a motor operated gear on the slave unit 13. The diamond wire 15 runs through two holes 20 drilled through the wall structure 33 during installation. The master saw unit 12 runs on the upper, inner track 7a and the lower inner track 7b and is driven along these tracks, utilising toothed rim 14. The wall structure 33 forms a portion of the total wire saw 25 after the saw is installed. Installation of the saw includes installation of the first set of tracks/the upper inner set of tracks 7a, the second set of tracks/the outer tracks 8, and the third set of tracks/the lower inner tracks 7b on the wall structure 33.

Figure 4:
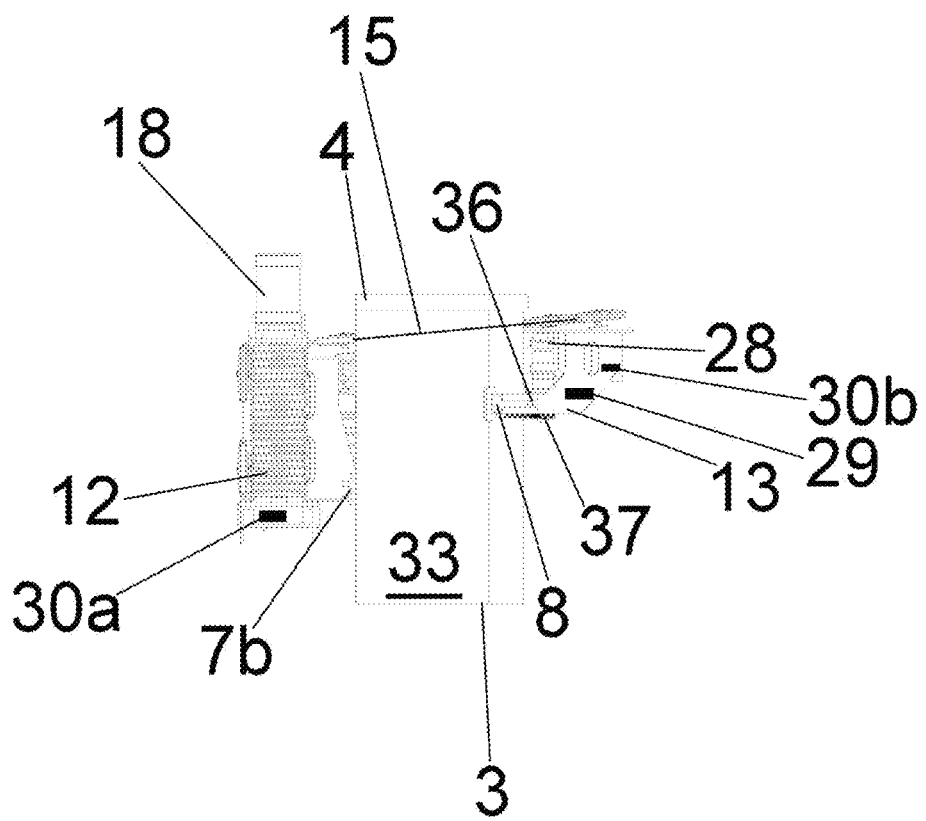
FIG. 4 is a side elevation of a saw on a wall structure.

FIG. 4 shows a portion of a cut platform leg with the wall structure 33 with the lower leg portion 3 and the upper leg portion 4 divided/split forming a cut interface, shown with the same line as the line indicating the cutting wire 15. The master saw unit 12 drives the cutting wire 15 in the cutting wire loop extending through the platform leg wall structure 33. The slave unit 13 runs along the outer saw track 8 and includes at least one wire wheel/sheave to return the cutting wire 15 back to the master saw unit 12. The inner and outer saw tracks 7b, 8 are C-shaped and designed to hold the slave unit 13 and the master saw unit 12 respectively to the platform leg to prevent the slave unit 13 and the master saw unit 12 from falling down in the event of a cutting wire 15 failure. Master track elements and slave track elements 36 may be formed as a wheel/ball bearing running in a C-shaped track to prevent the track element from derailing or leave the rail. Alternatively, the track elements may be solid blocks of low friction material allowing the track elements to slide inside the tracks/rails. The sawing portion is formed between the slave unit 13 and the master saw unit 12. Two portions of the sawing wire loop runs through the cutting area. The cut interface is inclined 5° off horizontal. A slave drive motor 28 drives a slave drive gear 37 along the gear rim/toothed rim running in parallel to the outer saw track 8 to move the slave unit 13 along the outer circumference of the platform leg in coordination with the master saw unit 12 to cut the leg. The slave drive motor 28 is powered by a battery pack 29, and is controlled through communication means 30b, communicating with communication means 30a on the master saw unit 12. The communication means may also communicate with the remote controller on the support vessel. Communication may include transfer of data related to wire loop speed, wire loop tension at several locations, motor temperature, battery charging state, cutting speed, saw location in relation to the tracks, current draw, etc. An electric wire drive motor 18 drives one or both of the magazine drums to 24 to rotate the wire loop formed by the sawing wire.

The cut is performed in a horizontal plane as gravity is used to hold the cut elements together and to avoid forces with a horizontal component.

Figure 5:
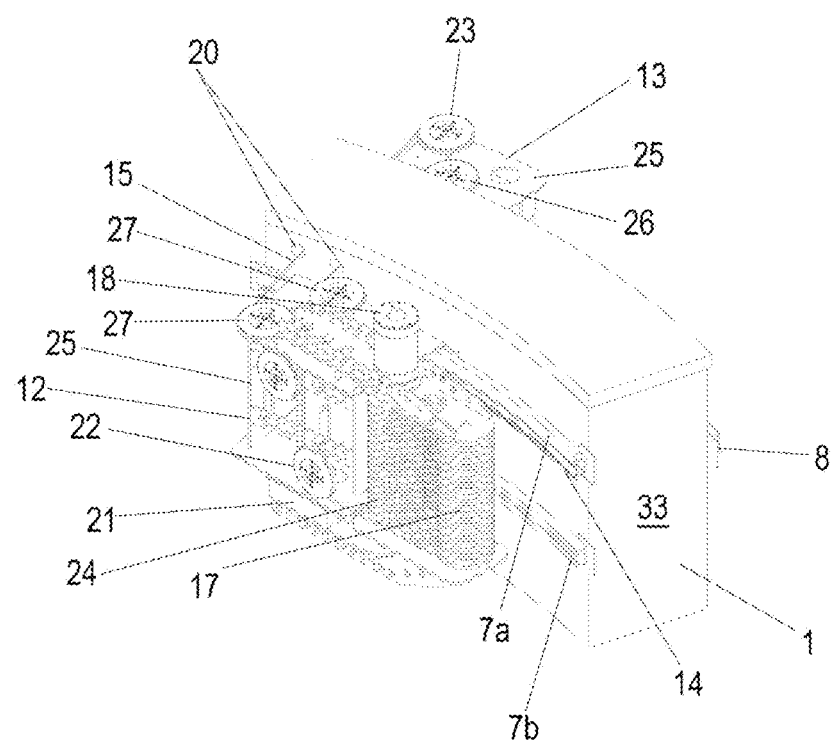
FIG. 5 is a perspective view of the saw shown on FIG. 4.

FIG. 5 is a detail of FIG. 3 showing a portion of a platform leg 1 with the wire saw 25 of the invention. The wire saw 25 is divided into the master saw unit 12 and the slave unit 13 each running along respective inner saw tracks 7a, 7b and outer saw tracks 8. The master saw unit 12 and the slave unit 13 are joined by the cutting wire 15, extending through holes 20 in the platform leg wall. The cutting wire may alternatively be a cutting belt. FIG. 5 shows the saw installed, ready to commence sawing.

The master saw unit 12 includes a sawing wire magazine 17 with two sawing wire magazine drums 24, holding the sawing wire. The sawing wire magazine 17 allows the sawing wire to contain a sufficient amount of diamonds or another cutting/abrasive material to be embedded in the cutting wire. The distance between the magazine drums 24 is controlled by a tension actuator 21 to control the tension in the cutting wire 15. The electric wire drive motor 18 drives one of the magazine drums to 24 to rotate the wire loop formed by the sawing wire. Four wire guide wheels 22, guides the sawing wire 15 between the cutting portion of the wire saw and the wire magazine 17. Free wheeling slave return wheel 23 on the slave unit 13 returns the cutting wire loop from the slave unit 13 and back to the master saw unit 12. Push wheel 26 ensures that the cutting wire not is pushed off slave return wheel when the cutting wire 15 is exposed to forces in the direction of the cut and the saw tracks. The slave return wheel 23 and the push wheel 26 are located above two cutting gap guide wheels 27 in relation to a horizontal plane to perform the inclined cut. Any of the cutting gap guide wheels 27, the slave return wheel 23 and the slave push wheel 26 may be slightly inclined to rotate the cutting wire 15 around its own axis. The motion of the sawing mechanism 12 and the slave unit 13 is coordinated by the saw drive driving the master saw unit 12 along the inner guide rail 7 and the gear rim 14, and the corresponding drive mechanism on the slave unit 13 drives the slave unit along the outer saw tracks 8 and an outer gear rim. The drive mechanism on the slave unit 13 is typically battery powered.

FIG. 6 shows the saw in greater detail to highlight the two master track elements 36 and the slave track elements 36 in the inner saw tracks 7a, 7b and two outer saw track 8 respectively. The 5° inclination of a horizontal line is also shown. The upper leg portion 4 is divided from the lower leg portion, forming the leg interface 16 along the line cut by sawing/cutting wire 15.

| | |
|---|---|
| 1 | Platform leg |
| 2 | Topsides |
| 3 | Lower leg portion |
| 4 | Upper leg portion |
| 5 | Platform |
| 6 | Plate girder deck structure/ |
| 7a | Inner/first saw tracks/rails, upper |
| 7b | Inner/first saw tracks/rails, lower |
| 8 | Outer/second saw tracks/rails |
| 9 | Sawing portion |
| 10 | Lower leg sloped cut surface |
| 11 | Saw drive |
| 12 | Master master saw unit |
| 13 | Slave unit |
| 14 | Inner gear rim |
| 15 | Cutting wire |
| 16 | Cut Interface |
| 17 | Wire magazine |
| 18 | Wire drive motor |
| 19 | Wire tension actuator |
| 20 | Drilled holes |
| 21 | Tension actuator |
| 22 | Guide wheels |
| 23 | Slave wire return wheel |
| 24 | Magazine drums |
| 25 | Wire saw |
| 26 | Slave push wheel |
| 27 | Cutting gap guide wheels |
| 28 | Slave drive motor |
| 29 | Battery pack |
| 30a | Communication means |
| 30b | Communication means |
| 31 | Remote controller |
| 32 | Support vessel |
| 33 | Wall structure |
| 34 | Retaining elements |
| 35 | Master track elements |
| 36 | Slave track elements |
| 37 | Slave drive gear |
| 38 | Outer gear rim |

The invention claimed is:

1. A gravity based structure (5) with a topside (2) on at least one hollow concrete platform leg (1) with a platform leg wall and a circular cross section, comprising an upper leg portion (4) cut off from a lower leg portion (3), the lower leg portion (3) being secured to a foundation, wherein the upper leg portion (4) is separate from and resting on the lower leg portion (3);

wherein the lower leg portion (3) has an upper sloped cut surface (10) inclined at an angle in the range of 1°-10° off a horizontal axis; and wherein the upper leg portion (4) has an upper leg sloped cut surface inclined at the same angle as the lower leg sloped cut surface (10) of the lower leg portion (3) whereby the angles are complementary, the sloped cut surfaces forming an inner and an outer conical portion with a common vertical longitudinal axis.

2. The gravity based structure (5) of claim 1, wherein the angle is in the range of 1°-5° off the horizontal axis.

3. The gravity based structure (5) of claim 1, wherein the angle is 5° off the horizontal axis.

4. The gravity based structure (5) of claim 1, comprising three or more hollow concrete platform legs (1).

5. The gravity based structure (5) of claim 1, wherein the lower leg portion (3) includes reinforcement steel embedded in the platform leg wall, wherein the reinforcement steel has an upper portion ending a distance below the upper sloped cut surface (10), whereby cut between the upper leg portion (4) and the lower leg portion (3) not extends through the reinforcement steel embedded in the platform leg wall of the lower leg portion (4).

6. A method of forming a conical cut through a concrete platform leg of a gravity based structure, with a leg wall (33) and a circular cross-section, comprising;

securing at least one first guide track (7a, 7b) in a horizontal plane around the platform leg (1);

forming at least one hole through the leg wall (33);

attaching a machine operated saw onto the horizontal first guide track with a sawing portion (9) through the hole (20) of the leg wall (33);

operating the saw with the sawing portion (9) running at an angle in a range 1°-5° off a horizontal axis while moving the saw along the horizontal guide track (7a, 7b) while sawing through the leg wall at the angle in the range 1°-5° off the horizontal axis, while sawing through a full 360° around the platform leg wall (33) thus dividing the concrete platform leg into an upper leg portion (4) and a lower leg portion (3).

7. The method of claim 6, wherein the machine operated saw is a wire saw with a master saw unit (12) and a slave unit (13), the method further comprising securing at least one second guide track (8) in a horizontal plane around the platform leg (1) at an opposite side of the first guide track (7a, 7b);

installing the slave unit (13) with at least one wire slave wire return wheel (23) on the at least one second guide track (8); and installing a cutting wire (15) between the master saw unit (12) and the slave unit (13).

\* \* \* \* \*